United States Patent Office 3,809,547
Patented May 7, 1974

3,809,547
ELECTRIC FURNACE STEELMAKING PROCESS USING OXIDE OF BORON ADDITIVE
Clifford Jackson Lewis, Lakewood, Colo., and Richard Scott Bruski, Walnut Creek, Calif., assignors to The Flintkote Company, White Plains, N.Y.
No Drawing. Filed Dec. 22, 1970, Ser. No. 100,820
Int. Cl. C21c 5/52
U.S. Cl. 75—11     17 Claims

ABSTRACT OF THE DISCLOSURE

The rate of dissolution of lime in the slag of a basic electric steelmaking furnace is accelerated by charging to the slag a boron-containing compound, particularly one that provides an oxide of boron, especially $B_2O_3$, under the operating conditions prevailing in the electric furnace. Illustrative of such additive compounds are boron trioxide, boric acid, anhydrous sodium tetraborate (borax), calcium metaborate, calcined and uncalcined colemanite and Rasorite. The additive preferably is delivered to the slag either in intimate mixture with the lime or separately but substantially simultaneously with the addition of the lime.

---

This invention relates to improvements in the basic electric furnace steelmaking process, and more particularly to a method and additive materials for increasing the rate of dissolution of lime in the slag of an electric furnace.

The basic electric furnace process for producing steel has been in extensive use in the United States and other countries. The process has a number of important advantages over other steelmaking processes, such as the Bessemer, the basic oxygen and the open-hearth processes, and currently is one of the principal steelmaking processes. In general the electric furnace can produce a wide range of grades of steel, can be very economical in certain geographical areas and where production requirements are relatively small, produces low phosphorus and low sulfur steels, permits easy adjustment and control of the slags, which is double-slag practice easily can be used in sequence, enables the chemical reactions to be fairly closely controlled, and provides hotter operating temperatures. The time cycle in an electric furnace is in the order of about 6 hours heat to heat, and the capacity is from a few tons to over 200 tons per heat, although intermediate capacities are more usual.

An electric furnace usually is charged with light or medium scrap, heavy scrap and then more light or medium scrap. Some cold pig iron or coke might then be added, or is added during and after the melt-down period. During the melt-down period, phosphorus, silicon, manganese, carbon and other impurities are oxidized. Oxygen for the oxidation is provided from a variety of sources, including ore, furnace atmosphere and gaseous oxygen. Oxidation of carbon to CO agitates the molten bath during a phase called the "boil."

Lime increases the basicity of the slag and facilitates the necessary chemical reactions between the slag and the impurities in the molten metal, particularly carbon, sulfur, manganese and phosphorus, during the subsequent refining period. High basicity is important to minimize phosphorus reversion to the melt from the slag at the hotter temperatures of the electric furnace compared to other processes. The lime dissolving in the slag also reduces the deteriorating effect on the basic refractory lining of the furnace of acidic ferrous silicate in the slag. The rate at which the lime reacts with the silica and other materials in the slag, and with the impurities in the molten metal, is thus an important factor in the electric furnace, and particularly the time cycle thereof.

Because the lime of the slag-forming charge is in solid particulate form, e.g., granulated burnt lime, it must first become dissolved in the fluid slag, which is principally siliceous in character, to condition the slag so that the desired chemical reactions referred to above can be achieved. Often, as is known in the art, special fluxing agents such as fluorspar are added to aid dissolution of the lime in the slag.

In the usual operation of the electric furnace, a portion of the time cycle for a complete heat is accounted for by the time required to dissolve the lime in the slag and thus to condition it due to the relatively slow rate at which the lime dissolves in the slag. Often, two slags are used, an initial oxidizing slag during the melt-down period, and then a reducing slag during the subsequent refining period. Moreover, reaction of the lime with the slag and other impurities, especially with siliceous materials tends to occur on the surface of the lime lumps. Surface coating reaction products on the lime, for example, dicalcium silicate, $2CaO.SiO_2$, tend to reduce the solubility and further reaction rates of the lime. Thus it can be seen that a decrease in the time required to disssolve the lime in, and thereby more quickly enable it to condition the slag, can be of great significance in reducing the total time cycle from heat to heat of the electric furnace process. The importance of rapid dissolution of the lime so it can perform its essential functions is indicated by the various expedients attempted and commonly used in commercial operation, not only of the basic electric furnace but of other steelmaking processes, to improve the rate of dissolution of the lime. The addition of fluorspar, for example, which acts by increasing the fluidity of the slag, is the most commonly used expedient to aid dissolution of the lime.

With the foregoing considerations in mind, it is an object of this invention to provide a method of accelerating the rate of dissolution of lime in an electric steelmaking furnace slag. Another object of this invention is to provide an improved method for the production of steel by the electric furnace process by accelerating the rate of dissoluiton of lime in the slag of the furnace whereby the slag is more rapidly conditioned for effecting refining, and thereby to effect a corresponding relative reduction in the total time cycle of the basic electric furnace from heat to heat. A further object of this invention is to provide materials to accelerate the rate of dissolution of lime in the electric furnace slag, and thereby to make possible the more prompt and efficient conditioning of the slag. These and other objects of this invention will be in part discussed in and in part apparent from the following more detailed disclosure.

Stated broadly, the objects of the invention can be achieved by the use of certain additive compounds, to be more fully set forth hereinafter, that serve to accelerate the dissolution rate of lime in the slag of a single-slag basic electric steelmaking furnace under the conventional operating conditions of the furnace. More particularly, the invention is especially advantageous to use for the production of carbon steels and low alloy steels by the single-slag electric furnace process.

As previously mentioned, the chemical reactions required to convert pig iron, scrap iron and ore into steel of good quality in an electric furnace are to a large extent dependent upon the basicity of the slag. The initial slag that is formed in the basic electric furnace consists principally of silica and various silicates, such as ferrous silicate, as well as free iron and oxidized metalloids. During the melt-down phase and the subsequent refining phase, the lime reacts with the silica and other components to effect removal of impurities, such as manganese, sulfur and phosphorus. For the lime to serve those purposes, it is necessary that it dissolve in and condition the slag, and thereby impart the necessary basicity to the slag. The time required for dissolution of the lime thus can be a significant factor in the efficiency of the entire electric furnace process.

In accordance with the present invention, the dissolution rate of lime in both the initial slag and the refining slag in an electric furnace can be increased to a significant extent. Thus the invention can be expected to enhance markedly the efficacy of the slags, to reduce significantly the time to condition them, and thus to reduce the time cycle from heat to heat. We have discovered that certain additive materials, as hereinafter set forth, bring about a definite acceleration in the rate of dissolution of lime in an electric furnace slag. Moreover, it is a feature and advantage of this invention that the foregoing significant improvement in accelerating the rate of dissolution of lime in an electric furnace slag is obtained in the practice of our invention without the accompanying introduction of elements inimical to the efficient production of quality steel.

The additive materials we have found to be effective and highly advantageous for achieving the aforementioned acceleration of the rate at which the lime becomes dissolved in a basic electric furnace slag comprise compounds that render the lime highly susceptible to dissolution in the slag and subsequent reaction with it. That is, we have found that the herein described improvements and advantages in the dissolution of lime in a basic electric furnace slag are obtained when the additives disclosed herein are used in the manner herein described.

More specifically, the additives we have found to act most suitably in achieving the increased rate of dissolution of the lime in siliceous basic electric furnace slags are boron-containing compounds, particularly compounds that are oxides of boron, especially $B_2O_3$, compounds that contain oxides of boron, or compounds that under the operating conditions of an electric furnace yield an oxide of boron. Examples of boron-containing compounds that we have found to be suitable for practicing the invention are boron trioxide, boric acid, anhydrous sodium tetraborate (borax), calcium metaborate, calcined and uncalcined colemanite and Rasorite. Each of those compounds brings about rapid dissolution of the solid particulate lime in the siliceous slag of the electric furnace. Other boron-containing compounds that accelerate the rate of lime dissolution in slags of an electric furnace include minerals such as ulexite, inderite, kernite and kurnakovite. It should be noted that mixtures of such boron-containing compounds, and commercially available materials containing them, also can be used as the additives in accordance with the invention.

The additives function rapidly upon contact with the basic electric furnace slag. Accordingly, addition of the additives should be substantially simultaneously with the slag-forming charge, that is, shortly before, with or shortly after the charge. Preferably the additives are added as part of the slag-forming charge.

The markedly increased rate of dissolution of lime in a siliceous basic electric furnace slag resulting from the use of the additives in accordance with the invention, as compared to the rate of dissolution in the absence of such additives, has been demonstrated and practiced on a "hot-stage" microscope, which operated in the following manner:

On the stage of the microscope there is placed a small crucible containing the material to be viewed. Electric resistances are arranged as part of the assembly to bring the material in the crucible to the temperature required to melt them. The resistances are controlled to maintain the molten material at the desired temperature. The assembly also includes a supply box, carried on a pivoted arm above the crucible, from which measured amounts of additive in the supply box can be discharged to the molten material in the crucible by swinging the pivoted arm to a position directly above the crucible. With this instrument, physical effects can be observed readily and photographed, if desired, at elevated temperatures under any desired atmosphere and with magnifications up to about 100 diameters.

We have used the hot-stage microscope to observe and measure the dissolution rate of lime in typical basic electric furnace slags, both in the absence of any of the instant additives and in the presence of measured amounts of various additives, which were added along with and at various time intervals before and after addition of the lime to the slag. By this means it has been possible to determine the effect of various additives present in the system in relation to the dissolution rate of the lime, and thereby in relation to the reaction rate between the lime and the other components of the electric furnace slag. The effectiveness of the materials used as additives in accordance with this invention is demonstrated by the data set forth below, which were obtained on a hot-stage microscope.

In a series of demonstrations a slag and lime having compositions typical of slags and lime found in the basic electric furnace were used. The compositions are set forth below. Only the lime was added to the molten slag in certain of the demonstrations; in others the lime particles first were pretreated by mixing them with one or another of each of the several additives. The additive compounds used in accordance with the invention were anhydrous borax [$Na_2B_4O_7$], boric acid [$H_3BO_3$], boron trioxide [$B_2O_3$], calcium metaborate [$Ca(BO_2)_2$], and calcined or uncalcined colemanite [$Ca_2B_6O_{11}$].

The compositions of the lime and slag used in each of the aforementioned demonstrations were:

| Lime composition | Percent | Slag composition | Percent |
|---|---|---|---|
| CaO | 96.10 | $SiO_2$ | 47.26 |
| MgO | 0.97 | FeO | 16.05 |
| $Fe_2O_3$ | 0.11 | MnO | 16.05 |
| $Al_2O_3$ | 0.30 | $Al_2O_3$ | 3.92 |
| $SiO_2$ | 0.62 | $P_2O_5$ | 3.52 |
| LOI | 1.43 | MgO | 3.39 |
|  |  | CaO | 10.00 |
| Total | 99.53 | Total | 100.19 |

The maximum dissolution times of the solid particulate lime in the slag, as observed and recorded in the control demonstrations and the demonstrations wherein one of the additive compounds was used, are shown in the following tabulation:

TABLE I

Maximum dissolution time (in seconds)

| | |
|---|---|
| Control—no additive | 16.6 |
| $Na_2B_4O_7$ as additive | 0.8 |
| $H_3BO_3$ as additive | 0.7 |
| $B_2O_3$ as additive | 0.7 |
| $Ca(BO_2)_2$ as additive | 2.0 |
| $Ca_2B_6O_{11}$ as additive | 2.0 |

Thus, as shown by the data in Table I, the boron-oxygen compounds serve outstandingly to increase the rate of dissolution of lime in a basic electric furnace slag, resulting in a very rapid dissolution of the lime particles in the slag.

Persons skilled in the art will recognize that the accelerated rate of dissolution of the lime particles in the molten slag will result in an increase generally of the rate at which the lime conditions the slag and reacts with the various components of the slag and the impurities in the molten metal. Such persons also will appreciate that the rate at which the reactions occur is an important factor in determining the efficiency of the slag, its refining efficacy, and the length of the time cycle from heat to heat of the process.

An additional salient feature of the invention is that the increase in the rate of dissolution of lime in slag by the practice of the invention is obtained with the use of relatively small amounts of the boron-containing additive, and without introducing elements inimical to the manufacture of steel, as frequently occurs from the use of agents previously used to condition the slag. Fluorspar, for example, the material almost universally used for that purpose, appears to function by reducing the viscosity of the slag, and the resultant slag takes on an almost "watery" condition. In general, greater amounts of fluorspar as compared to the amounts of the additive compounds of the present invention, based on the amount of lime charged to the furnace, are used. The fluorspar, however, in addition to frequently causing excessive thinning of the slag, which tends to interfere with pouring of the finished molten steel from the furnace, also tends to exert a deteriorating action on the refractory lining of the furnace. Another detrimental aspect of fluorspar is that it is a harmful air pollutant which is difficult to eliminate. The foregoing effects also tend to occur to varying degrees in the case of other fluoride compounds, such as sodium fluoride and sodium silicofluoride, which also have been used to condition steelmaking slags.

A further unexpected feature and advantage of the invention is that it is not essential for each particle of the lime to contact or to be associated with the additive compound, but only that a sufficient amount of the additive compound be added to the slag to bring about the desired effect.

The foregoing was demonstrated on the hot stage microscope above mentioned. A quantity of the same furnace slag used in the first series of demonstrations was placed in the crucible of the hot stage microscope assembly. The slag in the crucible was brought to a temperature of 2500° F., and there were then quickly dropped onto the molten slag, by means of the pivoted supply box of the assembly, 35 particles of lime, one of which had been previously treated with anhydrous borax. The treatment was by quickly dipping the particle into melted borax and allowing the adhering borax to cool and solidify on the surface of the lime particle. The particles of lime were of the same composition as the lime used in the first series of demonstrations. The 35 lime particles were dropped simultaneously onto the molten slag in the crucible, which was at a temperature of 2500° F. All the lime particles, i.e., the 34 untreated ones and the single treated particle, disappeared into and became dissolved in the molten slag in less than one second. This rather spectacular and unexpected result shows that, in the practice of the invention, it is necessary only that a sufficient amount of the additive be present.

An example of the effectiveness of the instant additives added together with but not attached to the lime was obtained on the hot-stage using a typical electric furnace initial single-slag of the following composition:

| | Percent |
|---|---|
| $SiO_2$ | 15.0 |
| FeO | 20.0 |
| CaO | 25.0 |
| MnO | 15.0 |
| MgO | 4.0 |
| $Al_2O_3$ | 1.0 |
| | 100.0 |

Five particles of lime, screen size −20, +30 as a control, dissolved in the slag at 2255° F. in about 30 seconds. One particle of raw colemanite added with the five lime particles caused dissolution in less than about 2 seconds. Other results with the slag were:

| Lime particles | Additive particles | Dissolution time, sec. |
|---|---|---|
| 9 | 1 colemanite (raw) | 3 |
| 50 | do | 6 |
| 5 | 1 $B_2O_3$ | 1.5 |
| 10 | 1 $B_2O_3$ | 1.3 |
| 50 | 1 $B_2O_3$ | 2.2 |

The additives of the invention exhibit the same effectiveness in accelerating the dissolution of lime in a typical later-formed melt-down slag of an electric furnace. Hot-stage work on a typical melt-down slag having the composition:

| | Percent |
|---|---|
| $SiO_2$ | 14.8 |
| FeO | 17.2 |
| CaO | 46.9 |
| MnO | 14.8 |
| MgO | 2.0 |
| $Al_2O_3$ | 3.4 |
| $P_2O_5$ | 0.6 |
| S | 0.1 |
| | 99.8 | at a temperature of 2820° showed that five lime particles, −20, +30, dissolved in about 300 seconds whereas with additive particles the lime dissolution was accelerated as follows:

| Lime particles | Additive particles | Dissolution time, sec. (approx.) |
|---|---|---|
| 5 | 1 $B_2O_3$ | 2 |
| 10 | 1 $B_2O_3$ | 3 |
| 50 | 1 $B_2O_3$ | 5 |
| 5 | 1 colemanite (raw) | 5 |
| 10 | do | 5.7 |
| 50 | do | 6 |

Reference has been made in the preceding description of the invention to the time of adding the instant additive compounds to the furnace. The primary consideration for gaining the benefits of the invention appears to be that as long as undissolved lime is present in the slag the additives will accelerate dissolution of the lime therein. The preferred boron-oxygen containing compounds, i.e., boric acid, anhydrous borax, calcium metaborate, colemanite and boron trioxide, tend to undergo volatilization at the temperatures prevailing in an electric furnace. Thus it is desirable to add the entire additive charge, or substantially all of it, at the time the slag-forming charge is added to the furnace, and along with any further addition of slag-forming material. It is possible, however, to add the additive shortly before or shortly after the slag-forming material is charged.

At present it appears that the amount of the additive compounds to be used according to the invention can vary widely depending on the operating conditions of the electric furnace, e.g., its temperature and the kind and proportions of materials charged to it, such as the composition of the slag. Although enhanced dissolution of the lime in the slag is obtained by using the additives in an amount of about ½% by weight of boron in the boron-containing compounds based on the weight of lime, better results are attainable by using at least about 1%, and preferably about 2%, of the additive compounds on the basis mentioned. There appears to be no clear-cut upper limit on the amount of additive compounds that can be used, although practical considerations, such as economics and possible untoward effects on the character of the slag of too much of the additive, suggest that no more than about a few percent greater than 2%, e.g., about 5%, is desirable to use.

In the demonstrations previously described, the limes utilized were commercial forms of high calcium quicklime, i.e., CaO plus impurities. Similar results are obtained by the use of the additive compounds of the invention in conjunction with commercial forms of dolomitic quicklime, i.e., CaO.MgO plus impurities. This was demonstrated by comparing (a) the dissolution time of ten particles of dolomitic quicklime added to a typical molten electric furnace slag of the composition used in the first series of demonstrations with (b) the dissolution time of ten particles of the dolomitic quicklime added to the molten slag simultaneously with the addition of one particle of $Na_2B_4O_7$-treated dolomitic lime. In the first instance, the maximum dissolution time of the ten particles of lime was fifteen seconds, whereas in the second instance the maximum dissolution time for the eleven particles, only one of which carried the additive, was less than one second. Because the instant additives can be used as effectively for accelerating the dissolution rate of dolomitic quicklime as well as high calcium quicklime, the term "lime" as used herein is to be considered as embracing both high calcium quicklime and dolomitic quicklime as well as other burnt limes generally used in the electric furnace.

Numerous demonstrations on the hot stage microscope have also been conducted to determine the effect, if any, exerted by the composition of the atmosphere existing over the molten basic electric furnace slag upon the accelerated rate of dissolution of the lime in the slag obtained by the use of the additive compounds of the invention. These demonstrations were conducted with atmosphere of air, oxygen, nitrogen, argon, carbon dioxide and carbon monoxide over the molten slag, using untreated lime as the control, and lime treated with boron oxide. The dissolution rates in each case were substantially identical with those in the first of above-mentioned series of demonstrations. Thus, it is apparent that the results obtained by the use of the additive compounds of the invention are neither dependent upon nor altered by the composition of the atmosphere over the molten electric furnace slag-lime system.

It will of course be understood that numerous changes can be made in the ingredients, proportions and conditions set forth above without departing from the scope of the invention as disclosed and as defined by the following claims.

We claim:

1. In the method of making steel by charging ferrous material, a source of oxygen and lime to an electric steelmaking furnace and by applying to the charge in said furnace an electrical current to melt-down said ferrous material, to oxidize non-ferrous material and to form a single basic slag of said lime, the improvement which comprises charging solid particulate lime to said electric steelmaking furnace in the presence of an additive compound that is an oxide of boron, that contains an oxide of boron or that yields an oxide of boron under the operating conditions prevailing in said electric steelmaking furnace said additive compound being present in an amount of about ½% to about 5% by weight of boron based on the weight of said lime, to accelerate dissolution of said lime and formation of said slag therein.

2. The improvement defined in claim 1 wherein said additive compound is charged substantially simultaneously with said lime.

3. The improvement defined in claim 1 wherein said additive compound is incorporated with said lime prior to the charging thereof.

4. The improvement defined in claim 1 wherein said additive compound is charged immediately prior to the charging of said lime.

5. The improvement defined in claim 1 wherein said additive compound is charged immediately after the charging of said lime.

6. The improvement defined in claim 1 wherein said additive compound is boric acid, anhydrous borax, boron trioxide, calcium metaborate, colemanite, Rasosite, ulexite, inderite, kernite or kurnakovite.

7. The improvement defined in claim 1 wherein said additive compound is boric acid.

8. The improvement defined in claim 1 wherein said additive compound is anhydrous borax.

9. The improvement defined in claim 1 wherein said additive compound is boron trioxide.

10. The improvement defined in claim 1 wherein said additive compound is calcium metaborate.

11. The improvement defined in claim 1 wherein said additive compound is colemanite.

12. The improvement defined in claim 1 wherein said additive compound is Rasorite.

13. The improvement defined in claim 1 wherein said additive compound is ulexite.

14. The improvement defined in claim 1 wherein said additive compound is inderite.

15. The improvement defined in claim 1 wherein said additive compound is kernite.

16. The improvement defined in claim 1 wherein said additive compound is kurnakovite.

17. The improvement defined in claim 1 wherein said additive compound is charged in an amount of from about 1% to about 3.5% by weight of boron therein based on the weight of said lime.

References Cited

UNITED STATES PATENTS

| | | | |
|---|---|---|---|
| 145,580 | 12/1873 | MacKay | 75—94 |
| 1,689,043 | 10/1928 | McKnight Jr. | 75—12 |
| 1,035,919 | 8/1912 | Tone | 75—11 |
| 3,574,597 | 4/1971 | Lewis et al. | 75—53 |
| 898,116 | 9/1908 | Kretschmer | 75—53 |
| 2,721,793 | 10/1955 | Magri Jr., et al. | 75—30 |
| 2,802,732 | 8/1957 | Crolius | 75—12 X |
| 2,909,422 | 10/1959 | Schwabe | 75—12 X |
| 3,649,249 | 3/1972 | Halley et al. | 75—96 |
| 3,030,204 | 4/1962 | Staggers et al. | 75—129 |

OTHER REFERENCES

Kirk-Othmer, Encycl. of Chem. Tech. vol. 3, p. 627, 1963, TP9E68.

Henderson, Metallurgical Dictionary, Reinhold Pub. Co., p. 307, 1954, TN609H4.

Webster, Dictionary, G.&C. Merriam Co., p. 1148, 1961, PE1625I61.

L. DEWAYNE RUTLEDGE, Primary Examiner

M. J. ANDREWS, Assistant Examiner

U.S. Cl. X.R.

75—30, 53, 58, 129